J. B. WOLF.
AUXILIARY SUPPORTING DEVICE FOR ENGINE CASINGS.
APPLICATION FILED FEB. 21, 1918.
1,269,890.
Patented June 18, 1918.
2 SHEETS—SHEET 2.
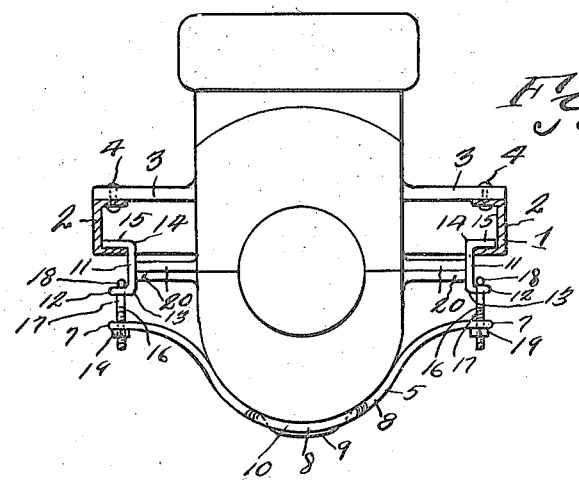
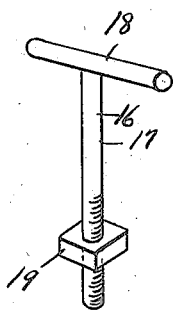
Inventor
J. B. Wolf
Witnesses
By
Attorneys

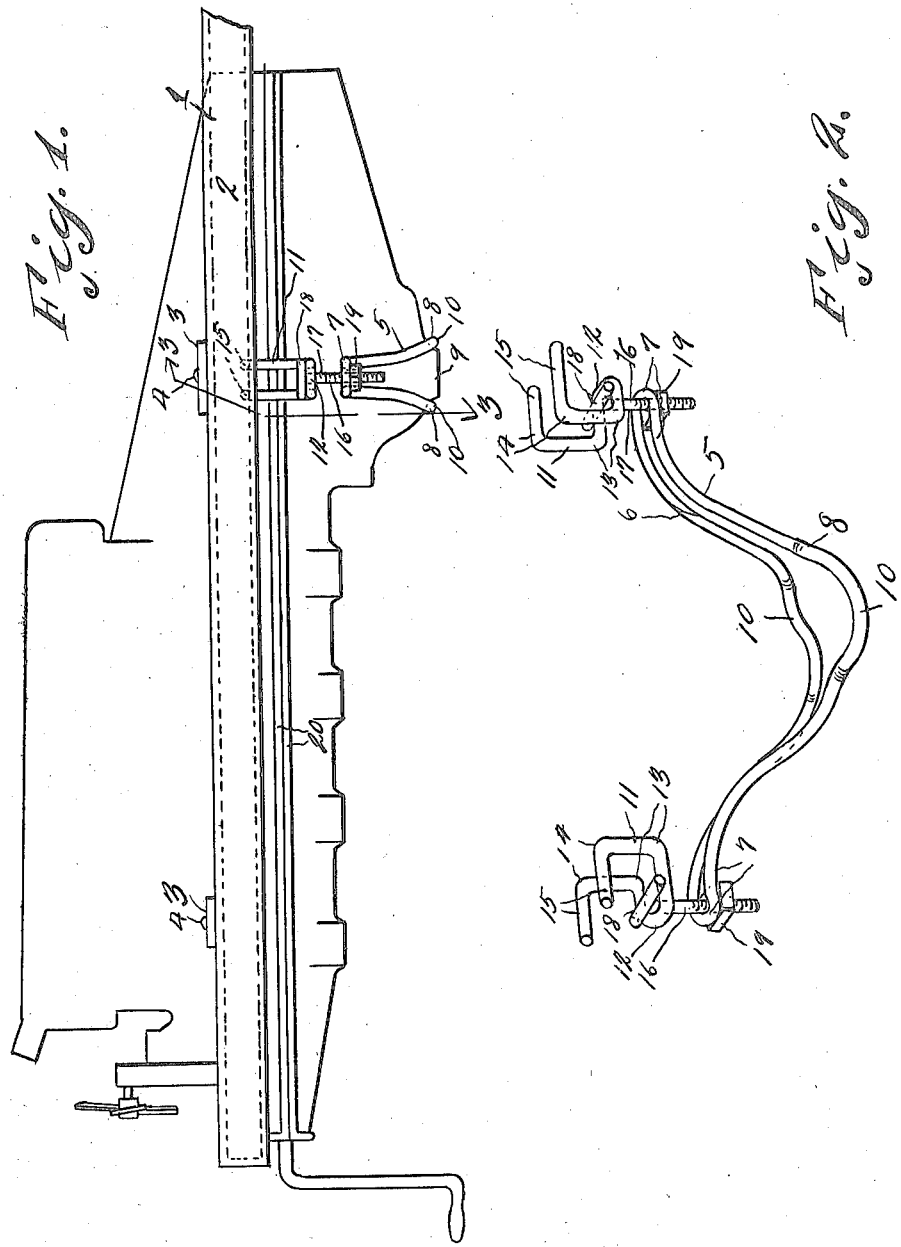

UNITED STATES PATENT OFFICE.

JOSEPH B. WOLF, OF MELROSE, IOWA.

AUXILIARY SUPPORTING DEVICE FOR ENGINE-CASINGS.

1,269,890.

Specification of Letters Patent.   Patented June 18, 1918.

Application filed February 21, 1918.   Serial No. 218,551.

*To all whom it may concern:*

Be it known that I, JOSEPH B. WOLF, a citizen of the United States, residing at Melrose, in the county of Monroe, State of Iowa, have invented a new and useful Auxiliary Supporting Device for Engine-Casings; and I do hereby declare the following to be a full, clear, and exact description of the invention, such as will enable others skilled in the art to which it appertains to make and use the same.

This invention relates to an improved auxiliary supporting device for an internal combustion engine casing, and one of the objects of the invention is to provide a device of this kind particularly adapted for supporting Ford types of engine casings.

A further object of the invention is the provision of a cradle having connections with the side channel bars of the frame of the automobile, thereby additionally supporting the casing and reinforcing the usual supporting means of said casing.

A further object of the invention is to provide an engine casing supporting cradle provided with quick detachable bracket connections with the side bars of the frame of the automobile for reinforcing and supporting the engine casing.

In practical fields the details of construction may necessitate alterations falling within the scope of what is claimed.

The invention comprises further features and combination of parts as hereinafter set forth shown in the drawings and claimed.

In the drawings:—

Figure 1 is a view in elevation of a portion of the frame of an automobile and an engine casing particularly of the Ford type, showing the supporting means therefor.

Fig. 2 is an enlarged detail perspective view of the supporting cradle for the casing.

Fig. 3 is a view on line 3—3 of Fig. 1 showing the engine casing and the supporting cradle in elevation and the side bars of the frame of the automobile in section.

Fig. 4 is a detail perspective view of a connecting device between the cradle and a supporting bracket which is detachably carried by the side bars of the automobile frame.

Referring more especially to the drawings 1 designates the frame of an automobile, preferably of the Ford type, and said frame comprises the side channel bars 2, to the upper flanges of which the lateral lugs 3 of the engine casing are bolted by means of the bolts 4. The supporting cradle 5 is constructed from a heavy piece of steel wire or rod material, bent to form an endless member. In order to construct this member, the steel wire or rod material is first bent, and its ends are connected together by means of brazing or welding, as shown at 6. After so connecting the ends, the opposite sides near the ends of the member are brought together, thereby forming the contracted loops 7. The sides of the member are bent downwardly centrally in order to provide a depending arch 8, which is so shaped as to receive and support the lower part of the engine casing, thereby relieving strain on the lateral lugs 3. It is to be noted that the lower part of the engine casing has a protrusion 9, and the extreme lower parts of the sides of the arch are bent forwardly and rearwardly, to provide the curved portions 10, which engage the under part of the engine casing forwardly and rearwardly of the protrusion 9, thereby preventing forward and rear movement of the engine casing. Supporting loop brackets 11 are provided, at the opposite side bars of the automobile frame. Each loop bracket is constructed from a single length of steel wire or rod material, bent to form the loop 12, while the arms beyond the loop are bent as at 13 and 14, to provide the overhanging parts 15. These overhanging parts 15 of both brackets are designed to engage the lower flanges of both side bars of the frame. Supporting connectors 16 are supplied. These connectors are T-shaped, and their vertical shanks 17 pass upwardly through the loops 12, whereby their transverse parts or heads 18 may engage the upper surface of said loops 12, and in fact engage the arms beyond said loops, thereby supporting said connectors as shown clearly in the drawings. The vertical shanks of said connectors extend downwardly through the loops 7, there being nuts 19 threaded on said shanks under the loops 7, thereby supporting the cradle adjustably. It has been found that the usual lugs such as 3, constantly become broken or cracked incident to strain and when such is the case there is nothing left to support the engine casing. If the rear or forward lug should break, the engine casing will become tilted, which would throw the drive shaft out of true, and would exert friction thereon, and at the same time damage the transmission.

As shown there is only one auxiliary supporting means or cradle provided in the present application, but in practice, it is the design of the invention to utilize a pair of auxiliary supporting means or cradles, one forward and one toward the rear, so that should either the forward or rear lugs 3 or both sets become broken, both ends of the engine casing will be reinforced and supported. It is to be noted that the flanges 20 of the two parts of the engine casing are wide enough, to prevent excessive movement of the brackets inwardly toward the engine casing, thereby avoiding disconnection of the brackets from the lower flanges of the side bars 2 of the automobile frame. It is to be further noted that the T-shaped connectors or bolts are prevented from excessive turning, since the transverse heads 18 will contact with the vertical parts of said brackets. It is to be noted that the loops 7 and 12 face outwardly, and thereby prevent any outward movement of the connectors or T-shaped bolts, and since the channel side bars are arranged so that their channels face each other, outward movement of the brackets is prevented.

The invention having been set forth, what is claimed as new and useful is:—

In an auxiliary supporting device for an engine casing, side bars of an automobile frame, an engine casing having lateral lugs secured to the upper flanges of said bars, an endless looped cradle engaging under the casing below said lugs, and connections between the cradle and the lower flanges of the side bars, said connections comprising T bolts engaging the end loops of the cradle, nuts on the lower ends of said bolts under the looped ends of said cradle, and looped brackets engaging the lower flanges of the side bars and having their looped ends engaging the T ends of the bolts.

In testimony whereof I have signed my name to this specification in the presence of two subscribing witnesses.

JOSEPH B. WOLF.

Witnesses:
  Roy L. Day,
  Thos. Burns.